(12) United States Patent
Berg et al.

(10) Patent No.: US 10,980,228 B2
(45) Date of Patent: Apr. 20, 2021

(54) ADJUVANT

(71) Applicant: Oro Agri Inc., Fresno, CA (US)

(72) Inventors: Paulo Sergio Berg, Londrina (BR); Jared Lance Vanderzyl, Clovis, CA (US); Melvin Donovan Pullen, Burbank, CA (US); Mai Yarbrough, Fresno, CA (US)

(73) Assignee: Oro Agri Inc., Fresno, CA (US)

( * ) Notice: Subject to any disclaimer, the term of this patent is extended or adjusted under 35 U.S.C. 154(b) by 0 days.

(21) Appl. No.: 14/936,467

(22) Filed: Nov. 9, 2015

(65) Prior Publication Data

US 2017/0127668 A1 May 11, 2017

(51) Int. Cl.
| *A01N 25/02* | (2006.01) |
| *A01N 25/30* | (2006.01) |
| *A01N 57/20* | (2006.01) |
| *A01N 25/04* | (2006.01) |

(52) U.S. Cl.
CPC ............ *A01N 25/02* (2013.01); *A01N 25/04* (2013.01); *A01N 25/30* (2013.01); *A01N 57/20* (2013.01)

(58) Field of Classification Search
CPC ........ A01N 25/02; A01N 25/30; A01N 25/04; A01N 57/20
See application file for complete search history.

(56) References Cited

U.S. PATENT DOCUMENTS

| 3,869,276 | A | 3/1975 | Priola et al. | |
|---|---|---|---|---|
| 5,266,553 | A * | 11/1993 | Champion | A01N 25/12 504/206 |
| 5,741,502 | A | 4/1998 | Roberts | |
| 6,258,369 | B1 * | 7/2001 | Pullen | A01N 65/36 424/405 |
| 6,355,675 | B1 * | 3/2002 | Beestman | A01N 37/50 514/456 |
| 6,444,618 | B1 | 9/2002 | Aven et al. | |
| 6,642,178 | B2 * | 11/2003 | Woznica | A01N 61/02 504/211 |
| 6,720,288 | B1 * | 4/2004 | Kanayama | A01N 43/56 504/128 |
| 7,341,735 | B2 * | 3/2008 | Pullen | A01N 25/00 424/405 |
| 2003/0069135 | A1 * | 4/2003 | Kober | A01N 25/02 504/116.1 |
| 2008/0146444 | A1 * | 6/2008 | Fabri | A01N 27/00 504/100 |
| 2008/0153708 | A1 * | 6/2008 | Jones | A01N 25/04 504/358 |
| 2008/0214400 | A1 * | 9/2008 | Pullen | A01N 25/30 504/357 |
| 2009/0018022 | A1 | 1/2009 | Yoshii et al. | |
| 2010/0160168 | A1 * | 6/2010 | Lindner | A01N 25/02 504/362 |

FOREIGN PATENT DOCUMENTS

| CN | 102524262 A | * | 7/2012 | |
| WO | WO 2015014767 A1 | | 2/2015 | |
| WO | WO-2015145105 A1 | * | 10/2015 | ............ A01N 25/02 |
| WO | WO 2016/062718 A1 | | 4/2016 | |

OTHER PUBLICATIONS

Translation of CN102524262A.*
Anonymous, "Soybean Based Adjuvants", Compendium of Herbicide Adjuvants, Jan. 1, 1998, pp. 1-9, XP055322900, Retrieved from the Internet: URL:http://www .herbicide-adjuvants.com/cgi-bin/adjdb.cgi?db=adjproductview&CropBasedSpecies=Soybean&sb=3&so=ascend&viewrecords=View+Records (retrieved on Nov. 24, 2016).
Bakke, "Analysis of Issues Surrounding the Use of Spray Adjuvants With Herbicides combinations as recommended on herbicide labels or based on field experience", Dec. 1, 2002, XP55203011, Retrieved from the Internet: URL:http://www.fs.usda.gov/ Internet/ FSE DO CUMENTS/fsbdev3045552.pdf (retrieved on Jul. 16, 2015).

* cited by examiner

Primary Examiner — Monica A Shin
(74) Attorney, Agent, or Firm — Knobbe Martens Olson & Bear LLP

(57) ABSTRACT

A stable self emulsifiable alkylated oil based adjuvant with pH buffer capabilities, a method of preparing an adjuvant and use of adjuvant with industrial, turf, ornamental, horticultural and agricultural applications.

10 Claims, 7 Drawing Sheets

LEAF PENETRATION AND TRANSLOCATION - 15 MIN. POST APPLICATION

Glyphosate + 2.5% AMS

Glyphosate + 2.5% AMS + 0.5% CPU

Glyphosate + 2.5% AMS + 0.5% CSU

Glyphosate + 2.5% AMS + 0.5% ORO-001

Glyphosate + 2.5% AMS

0 MIN

15 MIN

Glyphosate + 2.5% AMS + CPU

0 MIN

15 MIN

Glyphosate + 2.5% AMS + CSU

0 MIN                    15 MIN

Glyphosate + 2.5% AMS + ORO-001

0 MIN                    15 MIN

ADJUVANT

FIELD OF THE INVENTION

Agricultural adjuvant compositions are provided for improving pesticidal activity or application characteristics.

BACKGROUND OF THE INVENTION

Adjuvants are commonly used in agriculture to improve the performance of pesticides and can be added to the spray tank to improve pesticidal activity or application characteristics. Spray adjuvants are generally grouped into two broad categories: activator adjuvants which commonly are used to enhance post emergence performance, increase activity, assist with absorption into plant tissue, rain fastness and may include surfactants, crop oil concentrates, nitrogen fertilizers, spreader-stickers, wetting agents, and penetrants; and water conditioning adjuvants which widen the range of conditions under which a specific formulation is used, may alter the physical characteristics of the spray solution and include compatibility agents, buffering agents, antifoam agents, and drift control agents.

There are many different adjuvants available on the market. Adjuvants that are primarily oil based are typically crop oil concentrates that contain a high concentration of phytobland emulsifiable crop oil (generally petroleum based) and non-ionic surfactant. The purpose of the surfactant is to emulsify the oil in the spray solution and lower the surface tension of the overall spray solution. Crop oil concentrates attempt to provide the penetration characteristics of the oil, while capturing the surface tension reduction qualities of a surfactant. Crop oil concentrates are also important in helping solubilize less water-soluble products. Although vegetable and plant oil concentrates have performed less consistently than their petroleum-based counterparts, manufacturers are attempting to improve plant or vegetable-based oils by increasing their non-polar or lipophilic characteristics. The most common method has been through esterification of common seed oils such as methylated sunflower, soybean, cotton, and linseed oils. The methylated forms of these seed oil concentrates are comparable in performance to traditional (petroleum) crop oil concentrates.

In addition to a composition that is efficiently solubilized to provide a stable emulsion, performs well and penetrates, the target pH plays a significant role in crop protection products and can affect the efficacy of the tank-mixed products.

The pH of the tank mix affects the half-life solubility and efficacy of many of the crop protection products, which may result in solid precipitation or even degradation of active ingredients. Being able to acidify, buffer or otherwise control changes of pH in the tank mix can be important in preventing degradation of the products. Some crop protection products are sold with a pH buffer already included in the package but which could be negated by hard water or other tank mix products. In some cases, water conditioning adjuvants are used to adjust or buffer the pH and improve the products or solubilization in the mix, control its ionic state, and increase tank-mixture compatibility. pH buffers are most beneficial when used in extremely alkaline or even in acid water, which could otherwise have detrimental effects on the product's stability and performance. Some manufacturers have added acidifiers such as phosphoric acid, citric acid and propionic acid (methyl acetic acid) to the ethoxylated and propoxylated non-ionic surfactant and oil blends to reduce precipitation but with less efficiency on acceleration of penetration of the adjuvant into the target plant especially with increasing level of oils. Additionally, adding too much acidifier to certain adjuvants such as methylated seed oil (MSO), high surfactant methylated seed oils (HSMSO) or crop oil concentrate (COC) can contribute to phase separation of the concentrate or in the diluted tank mix with unstable emulsion stability.

There is thus a continued need to provide an improved, stable multipurpose adjuvant emulsion composition with pH buffer capabilities that addresses the shortcomings of the existing adjuvant compositions in the crop protection industry.

SUMMARY OF THE INVENTION

A stable emulsified adjuvant with pH buffer capabilities for use with industrial, turf, ornamental, horticultural and agricultural chemistries is provided.

More particularly is provided a stable emulsified adjuvant with pH buffer capabilities comprising at least a three component combination composition of an acid, an oil and a base pH adjuster. More particularly it comprises an alkylated sulfonated aromatic hydrocarbon acid selected from the group consisting of linear or branched alkyl benzene sulfonic acids; one or more natural or synthetic oil selected from the group consisting of a terpene oil, an alkylated fatty acid ester, an alkoxylated lipid, an alkoxylated alcohol, a heteroatomic hydrophilic lipid, a heteroatomic hydrophilic fatty acid, a heteroatomic hydrophilic alcohol or a combination of any of these compounds; and a base selected from the group consisting of tertiary amines such as but not limited to triethanolamine (TEA), diethanolamine (DEA), monoethanolamine (MEA). The stable emulsified adjuvant is preferably in liquid form.

In further embodiments, the adjuvant composition, in its concentrated form, comprises from 1 part by weight alkyl benzene sulfonic acid to 100 parts by weight of oil and from 2 parts by weight of oil to 1 part by weight alkyl benzene sulfonic acid. The adjuvant composition is neutralized, in certain embodiments, from 1 part by weight of alkyl benzene sulfonic acid to 1 part base component and from 20 parts by weight of alkyl benzene sulfonic acid to 1 part base component.

In further embodiments, the alkyl benzene sulfonic acid is blended at a ratio of 1 part by weight of alkyl benzene sulfonic acid to 100 parts by weight of oil; or 1 part by weight of alkyl benzene sulfonic acid to 2 parts by weight of oil, preferably 5 to 15 parts by weight of oil to 1 part by weight of alkyl benzene sulfonic acid.

In further embodiments, the oil may be a natural or synthetic, linear or branched, saturated or unsaturated, aliphatic or cyclic compound, modified or unmodified, such as alkylated vegetable oil, an essential or edible oil extracted from a variety of plants or parts of plants such as trees, shrubs, leaves, flowers, grasses, fluids, herbs, fruits and seeds, pure or mixed with each other that are combined with one or more oil modified such as ethoxylated, propoxylated, sulfonated, nitrated or phosphinated.

In further embodiments, the one or more oils may be a natural compound, modified by esterification or transesterification, such as an alkyl fatty acid ester, e.g., methyl esters, ethyl esters, propyl esters, butyl esters, 2-ethylhexyl esters or dodecyl esters, and is preferably a glycol or glycerol fatty acid, such as $C_{10}$-$C_{22}$ fatty acid esters, such as from vegetables oils, preferably oil-yielding plants species such as soybean, corn, sunflower, rapeseed oil, cottonseed oil, linseed oil, palm oil, safflower, coconut oil, castor oil, olive oil, canola oil among others pure or mixed with an essential or edible oil extracted from a variety of plants or parts of plants such as trees, shrubs, leaves, flowers, grasses, fluids, herbs, fruits and seeds, or mixed with each other that are combined with one or more oil modified such as ethoxylated, propoxylated, sulfonated, nitrated or phosphinated.

In further embodiments, the one or more oils may be a natural compound, modified by transesterification, such as alkyl fatty acid ester, preferably a soybean and/or corn methyl esters pure or mixed with an essential oil such as terpene oils mixed with each other that are combined with one or more compounds ethoxylated, propoxylated, butoxylated or both ethoxylated, propoxylated and/or then butoxylated and/or then ethoxylated again for example (EO/PO) or (EO/BU/EO) or (EO/PO/EO). The oil one or more oils can be mixed with other components, such as surfactants conventionally employed in adjuvant compositions or proprietary surfactants. Examples of surfactants include non-ionic, anionic, amphoteric, zwitterionic, cationic surfactants and mixtures of two or more thereof. The non-ionic surfactants include, but are not limited to, alkoxylated, preferably ethoxylated and/or propoxylated alcohols, preferably containing from 8 to 22 carbon atoms; alkyl(poly)glycosides, such as straight or branched $C_4$-$C_{10}$ alkyl(poly)glycosides; and alkoxylated, e.g., ethoxylated, sorbitan or sorbitol esters. Preferred ethoxylated alcohols have a degree of ethoxylation of from 1 to 50, more preferably 2 to 30, most preferably 3 to 10. Some alkoxylated alcohols contemplated for use include those based on branched alcohols, such as the Guerbet alcohols, e.g. 2-propylheptanol and 2-ethylhexanol, and $C_{10}$-OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals. The anionic surfactants include, but are not limited to, sulfosuccinates, alkyl benzene sulfonic acid salts, such as calcium or sodium dodecylbenzene sulfonate, alkyl sulfonates, alkyl ether sulfates, phosphate esters of optionally alkoxylated, preferably ethoxylated and/or propoxylated, alcohols, xylene sulfonates and cumene sulfonate salts, naphthalene or alkylnaphthalene sulfonates, which may be condensated. The cationic surfactants include, but are not limited to alkoxylated, preferably ethoxylated and/or propoxylated fatty amines or ether amines, and alkoxylated, preferably ethoxylated and/or propoxylated quaternary ammonium compounds, such as those commercially available as Berol 556 and Berol R648 (available from Akzo Nobel Surface Chemistry AB, Sweden). The zwitterionic/amphoteric surfactants include, but are not limited to betaine surfactants, such as alkyl-, alkylamidoalkylene and sulfo betaines, amine oxide surfactants, such as alkylamine oxides and alkylamidoalkylene amine oxides, fatty imino dipropionates and fatty iminoglycinates.

In further embodiments, the one or more oils may be a natural compound, modified by transesterification, such as castor oil fatty acid ester, preferably a castor oil methyl ester. The oil can be in either pure form or mixed with an essential oil, such as terpene oils or combined with one or more compounds that are surfactants, or that are ethoxylated, propoxylated or both ethoxylated and then propoxylated. For example, the oil can be a soy and or castor oil ester in combination with a terpene.

In further embodiments, the terpene oil may be an oil comprising one or more high terpene containing natural oils, said natural oil containing at least 50 percent terpene selected from but not exclusively from a group consisting of orange oil, grapefruit oil, lemon oil, lime oil, tangerine oil or pine oil or components thereof.

In further embodiments, the oil is blended at a ratio of 1 part by weight of terpene oil to 80 parts by weight of alkyl fatty acid ester; or 1 parts by weight of oil to 1 part by weight of an alkyl fatty acid ester, preferably 1 part by weight of terpene oil to between 15 to 25 parts by weight of an alkyl fatty acid ester.

In further embodiments, the alkyl benzene sulfonic acid is a linear or branched alkyl benzene sulfonic acid, preferably a Linear Dodecyl Benzene Sulfonic Acid (DDBSA). Suitable alkyl benzene sulfonic acids include $C_1$ to $C_{36}$ alkyl benzene sulfonic acids, including but not limited to linear or branched alkyls. Other suitable alkyl benzene sulfonic acids include $C_{10}$ to $C_{30}$ alkyl benzene sulfonic acids, including but not limited to linear or branched alkyls.

In further embodiments, an adjuvant concentrate is provided, comprising a combination of a linear alkyl benzene sulfonic acid blended with an alkyl benzene sulfonate alkaline or alkaline earth salt. Alkaline salts can include lithium salts, sodium salts, potassium salts, or the like. Alkaline earth salts can include beryllium salts, magnesium salts, calcium salts, strontium salts, or the like.

In further embodiments, the alkyl benzene sulfonic acid is blended at a ratio of 1 part by weight of a linear alkyl benzene sulfonic acid to from 0.05 to 10 parts by weight of alkyl benzene sulfonate alkaline or alkaline earth salt. For clarification, blends can include 1 part by weight of a linear alkyl benzene sulfonic acid to 10 parts by weight of alkyl benzene sulfonate alkaline or alkaline earth salt; or 20 parts by weight of linear alkyl benzene sulfonic acid to 1 part by weight of alkyl benzene sulfonate alkaline or alkaline earth salt; in still a further embodiment, the alkyl benzene sulfonic acid is blended at a ratio of 1 to 10 parts by weight of a linear alkyl benzene sulfonic acid to 1 part by weight of alkyl benzene sulfonate alkaline or alkaline earth salt.

In further embodiments, an adjuvant concentrate is provided, comprising a combination of a linear dodecyl benzene sulfonic acid blended with an alkyl benzene sulfonate alkaline or alkaline earth salt preferably a dodecyl benzene sulfonate sodium or calcium salt.

In further embodiments, an adjuvant concentrate is provided, comprising a combination of one linear alkyl benzene sulfonic acid neutralized with a base and an oil been the base from a group of tertiary amines, preferably triethanolamine (TEA).

In further embodiments, an adjuvant concentrate is provided, comprising a combination of a linear alkyl benzene sulfonic acid neutralized with triethanolamine (TEA) and oil in a sufficient amount to provide an pH of from 4 to 8, more preferably a pH range of from 4 to 7, more preferably between 5 and 6, when the adjuvant concentrate is mixed with water prior to being applied.

In certain embodiments, the concentrate may be formulated as a micro-emulsion or an emulsifiable concentrate. The term "micro-emulsion" as used herein, refers to a dispersion made of water, oil, and surfactant(s) that is an isotropic and thermodynamically stable system with dispersed domain diameter varying approximately from 1 to 100 nm, usually 10 to 50 nm (IUPAC).

In an embodiment, the adjuvant is a concentrate that is to be diluted for use in water or other chemistries, e.g., solutions of water, glycols and alcohol or other water-miscible liquids, e.g., methanol, ethanol, monoethylene glycol, propylene glycol, or the like.

In certain embodiments, the concentrate may be further diluted with water in a mixing tank, spray tank or container, in an inline irrigation system or in the field with other devices.

In certain embodiments, the micro-emulsion, or the emulsifiable concentrate is diluted in water to be applied to plants, pests, weeds, seeds, soil, urban places, forests, animals among other.

In certain embodiments, the adjuvant concentrate comprises a combination of an alkyl benzene sulfonic acid, one or more oils and a tertiary amine base to neutralize the alkyl benzene sulfonic acid and other additives selected for use for specific proposes. These additives can include preservatives, clarifiers, anti-freezing agents, hydrotopes, stabilizers, antioxidants, acidifiers, quelants, complexing agents, dyes, rheology modifiers, antifoams, and water or other solvents. A single additive can be used, or multiple additives can be used.

In certain embodiments, the adjuvant concentrate, comprising a combination of an alkyl benzene sulfonic acid, one or more oils and a tertiary amine base to neutralize the alkyl benzene sulfonic acid and other additives that have pH dependency, is formulated for specific uses or purposes, and includes additives such as nutrients, stimulants, growth agents, sugars, amino-acids, micronutrients including fertilizers and hormones, and water or other solvents. A single additive can be used, or multiple additives can be used.

In certain embodiments, a process is provided for producing an adjuvant from a formulated concentrate which when diluted in water, glycols or other chemistry, results in faster penetration of the active ingredient (fertilizer, pesticide, or the like) into a target crop or pest.

A method is also provided for manufacturing an adjuvant which is suitable for delivery of active agricultural chemistries to a target, the method comprising the steps of: (a) preparing a bulk concentrate according to an embodiment; (b) homogenizing the product to form a uniform mixture; and (c) adding water or other chemistry to form a stable pH buffered emulsion.

In a further embodiment the adjuvant concentrate can be tank mixed with water and other chemistries or can be formulated with other chemistries such as pesticides, fertilizers or nutrients for further dilution in the field at a later stage.

In a further embodiment, the adjuvant concentrate is employed in connection with a pesticide, for example, but not limited to, insecticide, fungicide, herbicide, desiccant, defoliant, acaricide, miticide, bactericide, biocide, ovicide, nematicide and insect and plant growth regulators.

The concentrates of the embodiments are formulations which result in a stable emulsion with a buffered pH zone of around 4 to 8, more preferably 4 to 7 and most preferably 5 to 6 when diluted in soft or hard water or other chemistries for purpose of application.

In a first aspect, an emulsified adjuvant concentrate is provided, comprising: an alkylated sulfonated aromatic hydrocarbon acid; one or more oils; and a pH adjuster, wherein the pH adjuster is a base, wherein the emulsified adjuvant concentrate is configured to be stable in a concentrated form and in a diluted form, and wherein the emulsified adjuvant concentrate is configured to yield, when diluted, a composition having a buffered pH value of from 4 to 8.

In an embodiment of the first aspect, the oil is a natural oil.

In an embodiment of the first aspect, the oil is a transesterified natural oil.

In an embodiment of the first aspect, the one or more oils is selected from the group consisting of an alkylated fatty acid ester, a terpene oil, an alkoxylated lipid, an alkoxylated alcohol, a heteroatomic hydrophilic lipid, a heteroatomic hydrophilic fatty acid, a heteroatomic hydrophilic alcohol, and a combination thereof.

In an embodiment of the first aspect, the one or more oils are selected from the group consisting of a natural oil, a synthetic oil, a linear compound, a branched compound, a saturated oil, an unsaturated oil, an aliphatic compound, a cyclic compound, a modified oil, an unmodified oil, an alkylated vegetable oil, an essential oil, an edible oil, an oil extracted from a plant, an oil extracted from a part of a plant, an oil extracted from a tree, an oil extracted from a shrub, an oil extracted from a leaf, an oil extracted from a flower, an oil extracted from a grass, an oil extracted from a plant fluid, an oil extracted from an herb, an oil extracted from a fruit, an oil extracted from a seed, a pure oil, a mixture of oils, an ethoxylated oil, a propoxylated oil, a sulfonated oil, a nitrated oil, a phosphinated oil, and combinations thereof.

In an embodiment of the first aspect, the one or more oils are selected from the group consisting of a natural compound, a compound modified by transesterification, an alkyl fatty acid ester, a methyl ester, an ethyl ester, a propyl ester, a butyl ester, a 2-ethylhexyl ester, a dodecyl ester, a glycol fatty acid, a glycerol fatty acid, a $C_{10}$-$C_{22}$ fatty acid esters, a vegetables oil, a soybean oil, a corn oil, a sunflower oil, a rapeseed oil, a cottonseed oil, a linseed oil, a palm oil, a safflower oil, a coconut oil, a castor oil, an olive oil, canola oil, a pure oil, a mixture of oils, and combinations thereof.

In an embodiment of the first aspect, the one or more oils is a pure oil, and wherein the one or more oils is at least one oil selected from the group consisting of a soybean methyl ester, a corn methyl ester, and a castor oil methyl ester.

In an embodiment of the first aspect, the one or more oils is at least one oil selected from the group consisting of a soybean methyl ester, a corn methyl ester, and a castor oil methyl ester, and wherein the adjuvant concentrate further comprises one or more alkoxylated components selected from the group consisting of an ethoxylated component, a propoxylated component, and a butoxylated component.

In an embodiment of the first aspect, the one or more alkoxylated components is further alkoxylated to form a combination of either an ethoxylated and propoxylated component or an ethoxylated and butoxylated component.

In an embodiment of the first aspect, the one or more alkoxylated components is further alkoxylated to form a combination of either an ethoxylated and propoxylated and ethoxylated component or an ethoxylated and butoxylated and ethoxylated component.

In an embodiment of the first aspect, the one or more oils is a pure oil, and wherein the one or more oils is at least one oil selected from the group consisting of a soybean methyl ester, a corn methyl ester, a castor oil methyl ester, and a combination thereof, wherein the adjuvant concentrate further comprises at least one member of the group consisting of an essential oil, a citrus oil, a component of a citrus oil, an ethoxylated component, a propoxylated component, an ethoxylated and then propoxylated component, an ethoxylated and then butoxylated component, and combinations thereof.

In an embodiment of the first aspect, the one or more oils is a terpene oil, wherein the terpene oil comprises one or more terpene containing natural oils, wherein the one or more terpene containing natural oils contains at least 50% of a terpene selected from the group consisting of orange oil, grapefruit oil, lemon oil, lime oil, tangerine oil, pine oil, and components thereof.

In an embodiment of the first aspect, the one or more oils is a terpene oil mixed with an alkyl fatty acid ester, wherein the terpene oil is present in the adjuvant concentrate in a ratio of 1 part by weight of terpene oil to from 1 to 80 parts by weight of alkyl fatty acid ester.

In an embodiment of the first aspect, the one or more oils is a terpene oil mixed with an alkyl fatty acid ester, wherein the terpene oil is present in the adjuvant concentrate in a ratio of 1 part by weight of terpene oil to from 15 to 25 parts by weight of alkyl fatty acid ester.

In an embodiment of the first aspect, the alkylated sulfonated aromatic hydrocarbon acid is selected from the group consisting of linear alkyl benzene sulfonic acids, branched alkyl benzene sulfonic acids, and combinations thereof.

In an embodiment of the first aspect, the alkyl benzene sulfonic acid is selected from the group comprising a linear alkyl benzene sulfonic acid, a branched alkyl benzene sulfonic acid, combinations thereof, acid forms thereof, and salt forms thereof.

In an embodiment of the first aspect, the linear alkyl benzene sulfonic acid is linear dodecyl benzene sulfonic acid.

In an embodiment of the first aspect, the alkyl benzene sulfonic acid is present in the adjuvant concentrate in a ratio of 1 part by weight alkyl benzene sulfonic acid to 100 parts by weight of oil.

In an embodiment of the first aspect, the alkyl benzene sulfonic acid is present in the adjuvant concentrate in a ratio of 1 part by weight of alkyl benzene sulfonic acid to 2 parts by weight of oil.

In an embodiment of the first aspect, the alkyl benzene sulfonic acid is present in the adjuvant concentrate in a ratio of 1 part by weight alkyl benzene sulfonic acid to 5 to 15 parts by weight of oil.

In an embodiment of the first aspect, the linear alkyl benzene sulfonic acid comprises a combination of a linear alkyl benzene sulfonic acid blended with an alkyl benzene sulfonate alkaline salt or an alkyl benzene sulfonate alkaline earth salt.

In an embodiment of the first aspect, the linear alkyl benzene sulfonic acid is present in the adjuvant concentrate at a ratio of 10 to 20 parts by weight of linear alkyl benzene sulfonic acid to 1 to 10 parts by weight of alkyl benzene sulfonate alkaline or alkyl benzene sulfonate alkaline earth salt.

In an embodiment of the first aspect, the linear alkyl benzene sulfonic acid is present in the adjuvant concentrate at a ratio of 1 to 10 parts by weight of linear alkyl benzene sulfonic acid to 1 part by weight of alkyl benzene sulfonate alkaline or alkyl benzene sulfonate alkaline earth salt.

In an embodiment of the first aspect, the base is selected from the group consisting of tertiary amines, triethanolamine, diethanolamine, monoethanolamine, and combinations thereof.

In an embodiment of the first aspect, the base is one or more tertiary amines, and wherein the one or more tertiary amines are present in the adjuvant concentrate at a ratio of 1 to 6 parts by weight of the one or more tertiary amines to 1 to 10 parts by weight of alkyl benzene sulfonic acid.

In an embodiment of the first aspect, the adjuvant concentrate comprises one or more additives, wherein the one or more additives is selected from the group consisting of preservatives, clarifiers, anti-freezing agents, hydrotopes, stabilizers, antioxidants, quelants, complexing agents, dyes, rheology modifiers, antifoams, nutrients, stimulants, growth agents, amino-acids, micronutrients, hormones, water, other solvents, and combinations thereof.

In an embodiment of the first aspect, the adjuvant concentrate is a form of a mixture as a tank mix with one or more chemistries, wherein the one or more chemistries are selected from the group consisting of water, pesticides, fertilizers, desiccants, defoliants, biocide, stimulants, amino and other acids, proteinates, and combinations thereof.

In an embodiment of the first aspect, the adjuvant concentrate is configured to be diluted with one or more in-tank mix chemistries to yield a stable diluted emulsion with a buffered pH value.

In an embodiment of the first aspect, a dilution rate with one or more in-tank mixed chemistries configured for field application is from 0.1% to 10% by volume of adjuvant concentrate to 1% by volume in-tank mix chemistries.

In an embodiment of the first aspect, the adjuvant concentrate is configured to yield a stable emulsion with a buffered pH.

In an embodiment of the first aspect, the pH value of the emulsion is between 4 and 7.

In an embodiment of the first aspect, the pH value of the emulsion is between 5 to 6.

In an embodiment of the first aspect, the adjuvant concentrate is configured for improving rain-fastness through accelerated uptake into a plant.

In an embodiment of the first aspect, the adjuvant concentrate is a liquid.

In a second aspect, an adjuvant is provided, comprising the adjuvant concentrate of the first aspect or any of the embodiments of the first aspect, diluted in water, wherein the adjuvant concentrate is configured for dilution in a mixing tank, a spray tank, a container, or an inline irrigation system.

In an embodiment of the second aspect, the adjuvant further comprises an additional active ingredient.

In an embodiment of the second aspect, the additional active ingredient comprises at least one pesticide.

In an embodiment of the second aspect, the additional active ingredient is selected from the group consisting of insecticides, fungicides, herbicides, desiccants, defoliants, acaricides, nutrients, miticides, bactericides, biocides, ovicides, nematicides, insect growth regulators, plant growth regulators, and combinations thereof.

In an embodiment of the second aspect, the adjuvant is configured for application on at least one member of the group consisting of plants, pests, weeds, seeds, soil, urban places, animals, and forests.

In a third aspect, a method for manufacturing an emulsified stable pH buffered adjuvant composition is provided, comprising: preparing the adjuvant concentrate of the first aspect or any of the embodiments of the first aspect; homogenizing the adjuvant concentrate to form a uniform mixture; and adding at least one of water or other chemistries to the uniform mixture, whereby an emulsified stable pH buffered adjuvant composition is obtained.

DETAILED DESCRIPTION

Figure 1:
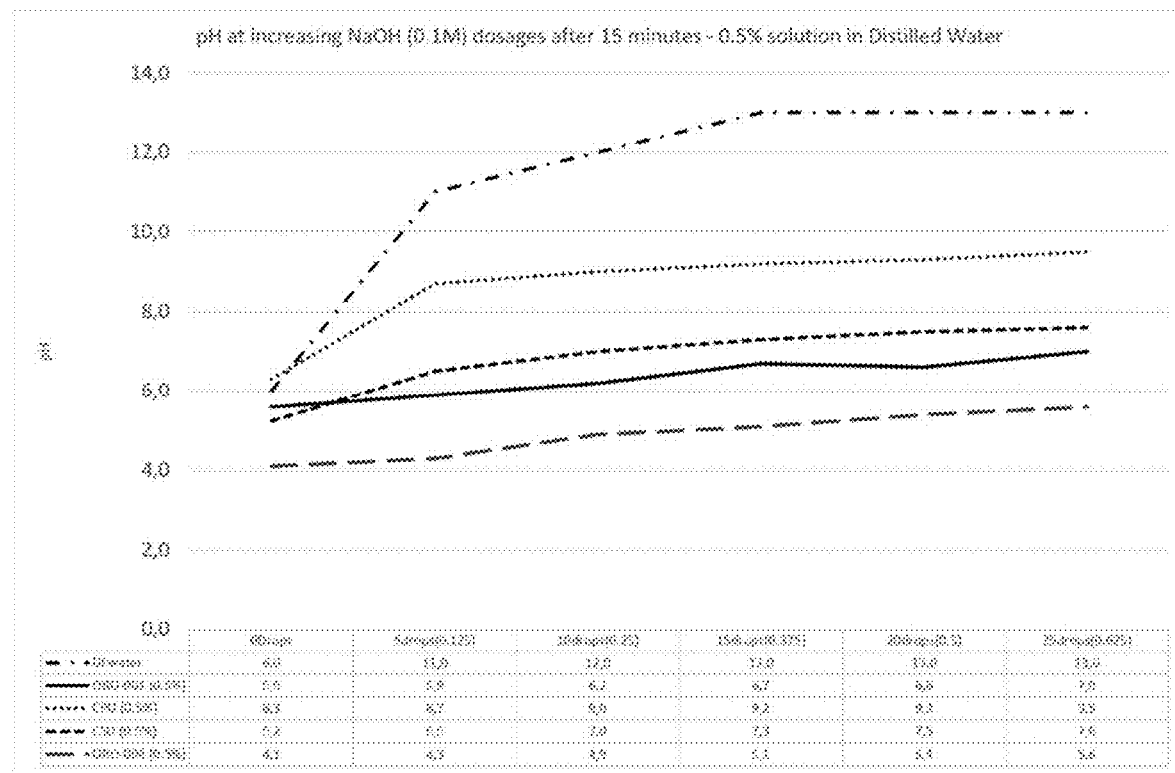
FIG. 1 is a graph depicting the buffering characteristics of two of the embodiments of the adjuvant concentrate compared to two commercial products using a solution of NaOH at 0.1M and a solution of 0.5% each adjuvant prepared in distilled water
Figure 2:
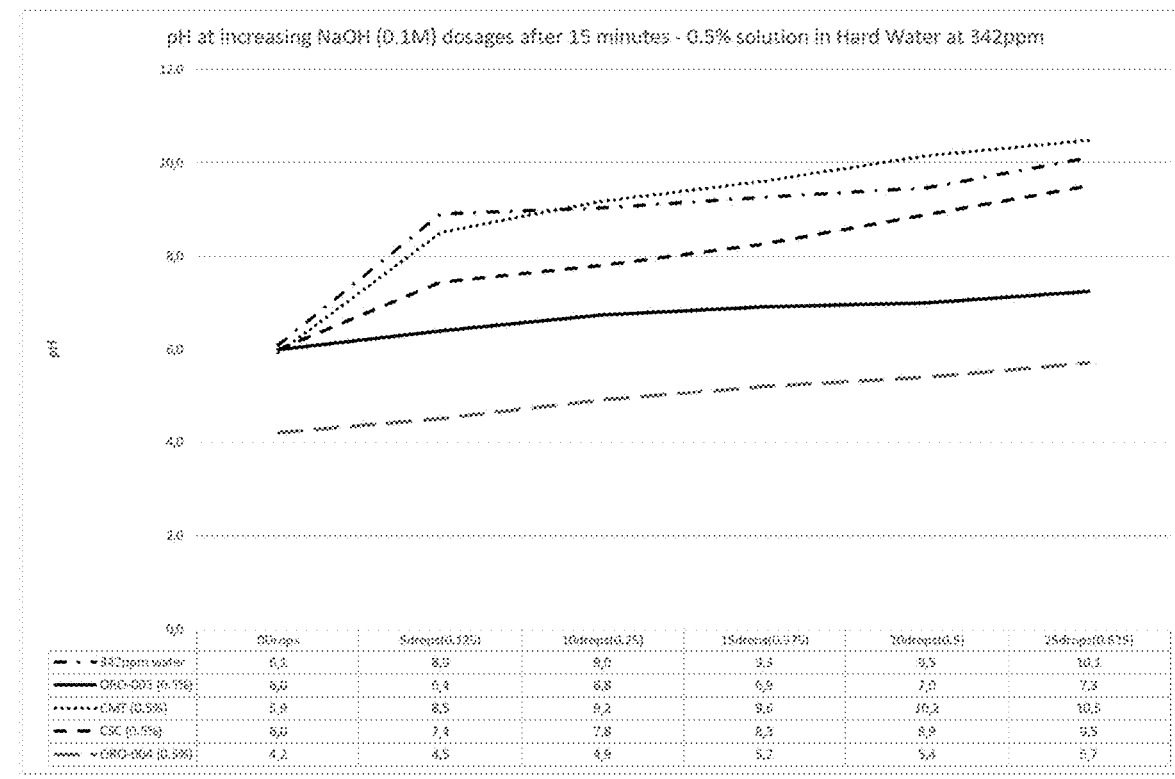
FIG. 2 is a graph depicting the buffering characteristics of two of the embodiments of the adjuvant concentrate compared to two commercial products using a solution of NaOH at 0.1M added to a solution of 0.5% with each adjuvant prepared in hard water at 342 ppm of hardness.
Figure 3:
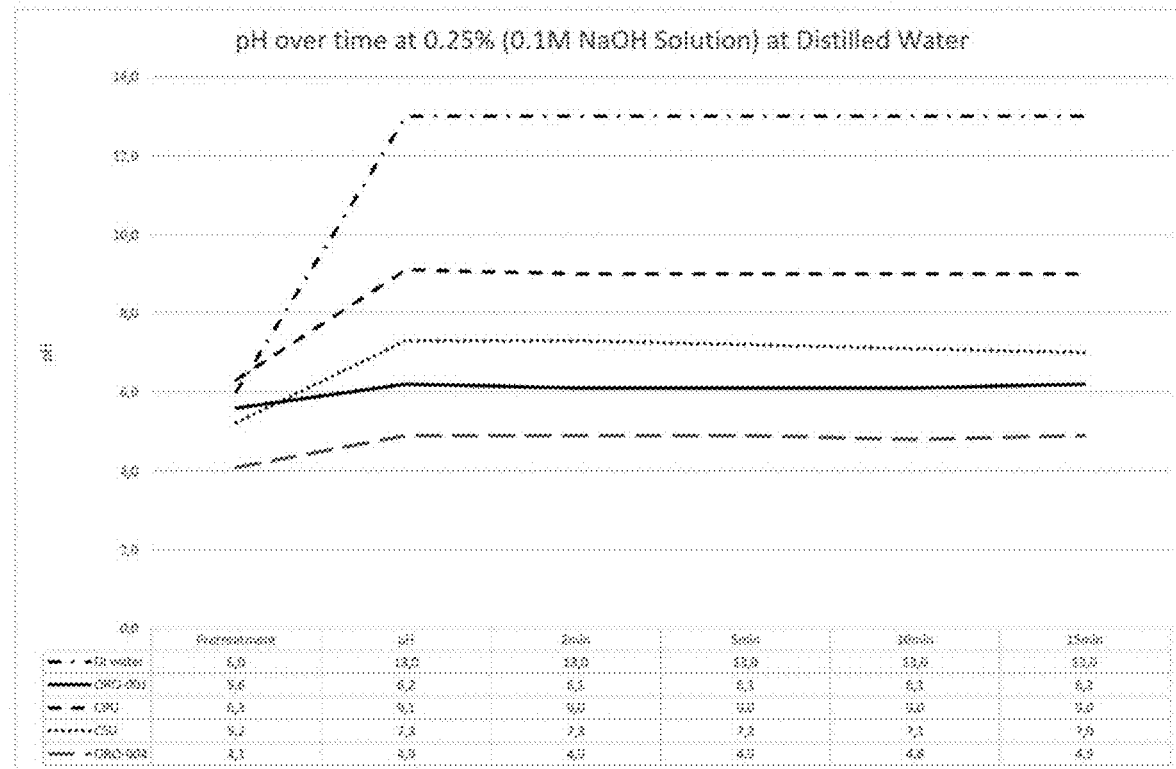
FIG. 3 is a graph depicting the buffering characteristics of two of the embodiments of the adjuvant concentrate compared to two commercial products, evaluating pH value fluctuations for a period of 15 minutes, wherein a solution at 0.25% of NaOH at 0.1M added to a solution of 0.5% of each adjuvant prepared in distillated water.
Figure 4:
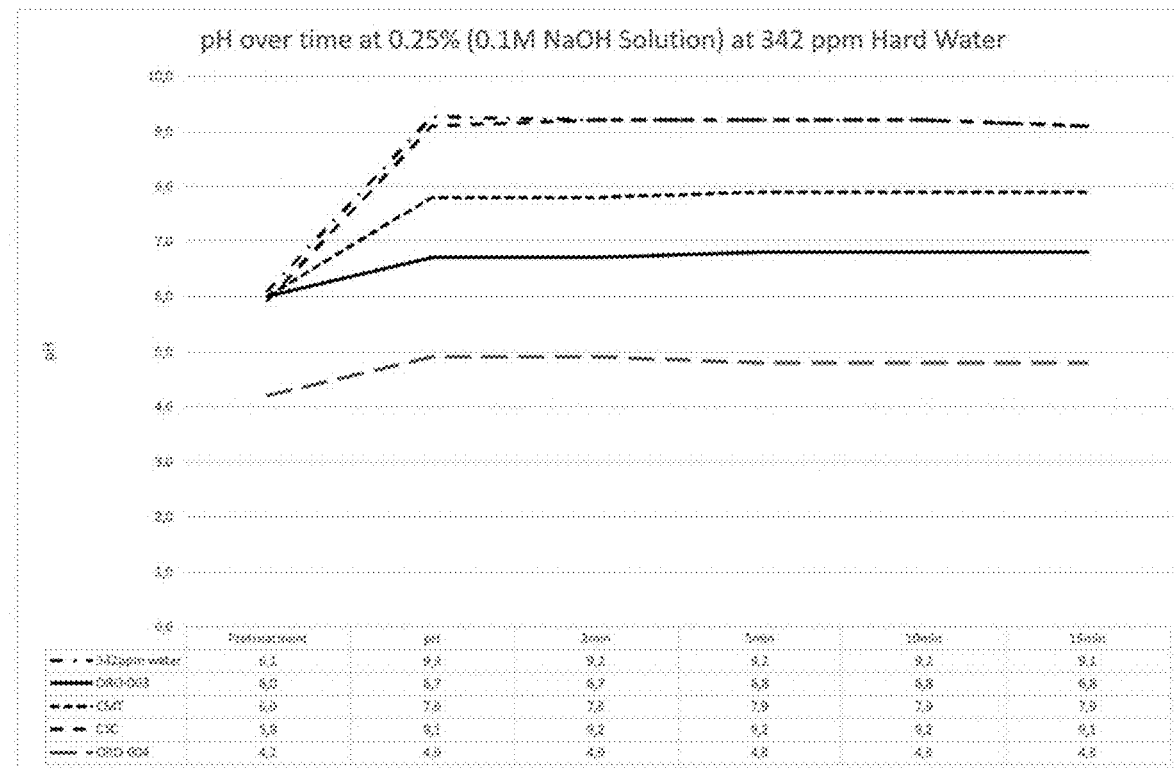
FIG. 4 is a graph depicting the buffering characteristics of two of the embodiments of the adjuvant concentrate compared to two commercial products, evaluating pH value fluctuations for a period of 15 minutes, wherein a solution at 0.25% of NaOH at 0.1M is added to a solution of 0.5% of each adjuvant prepared in hard water at 342 ppm of hardness.
Figure 5:
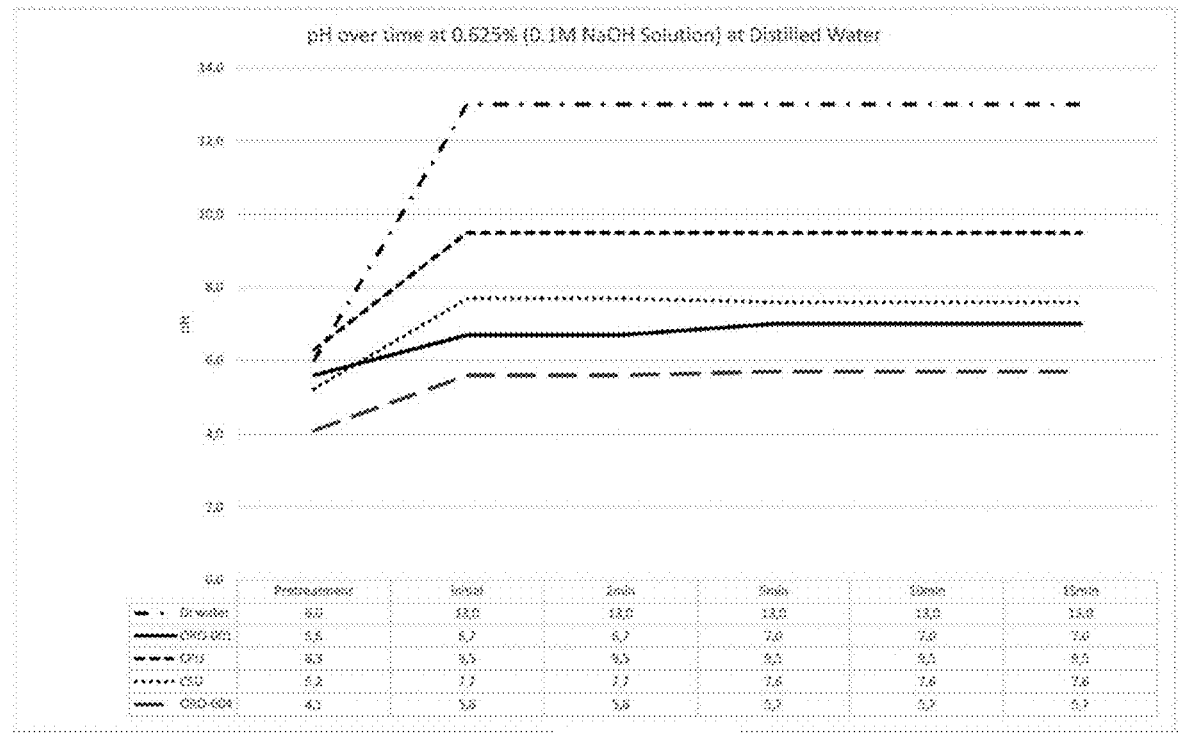
FIG. 5 is a graph depicting the buffering characteristics of two of the embodiments of the adjuvant concentrate compared to two commercial products, evaluating pH value fluctuations for a period of 15 minutes, wherein a solution at 0.625% of NaOH at 0.1M added to a solution of 0.5% of each adjuvant prepared in distillated water.
Figure 6:
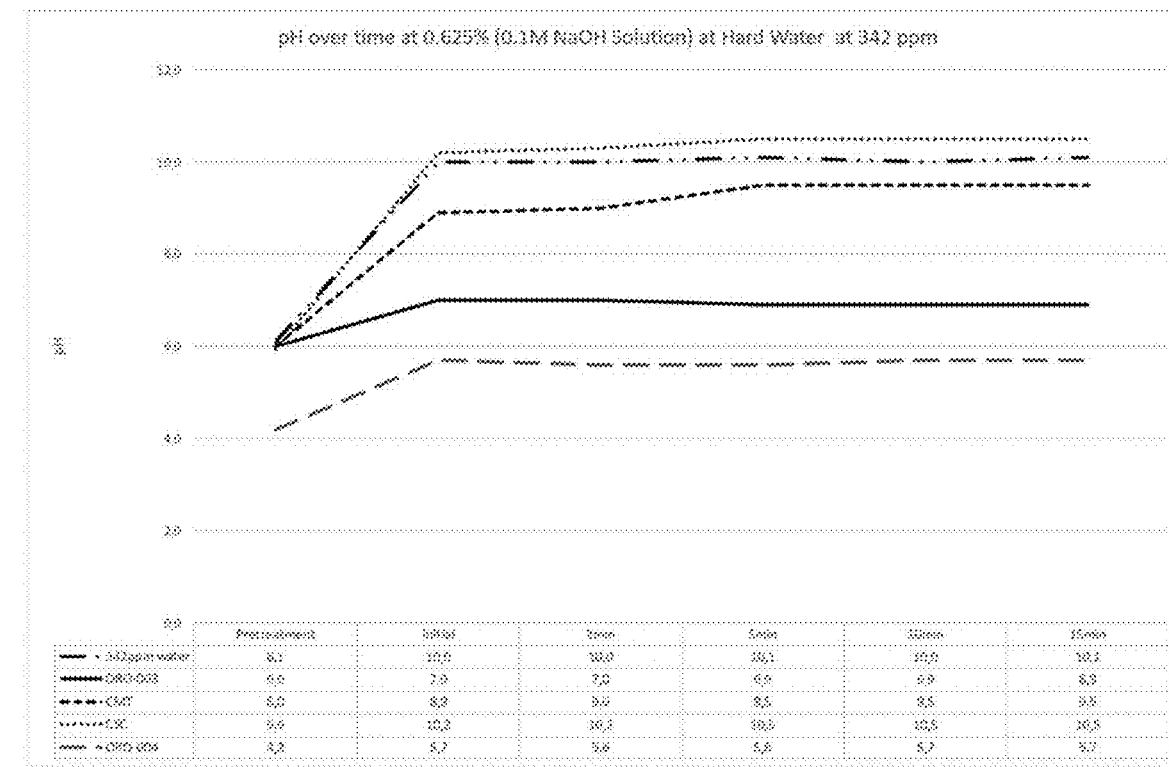
FIG. 6 is a graph depicting the buffering characteristics of two of the embodiments of the adjuvant concentrate compared to two commercial products, evaluating pH value fluctuations for a period of 15 minutes, wherein a solution at 0.625% of NaOH at 0.1M added to a solution of 0.5% of each adjuvant prepared in hard water at 342 ppm of hardness.
Figure 7:
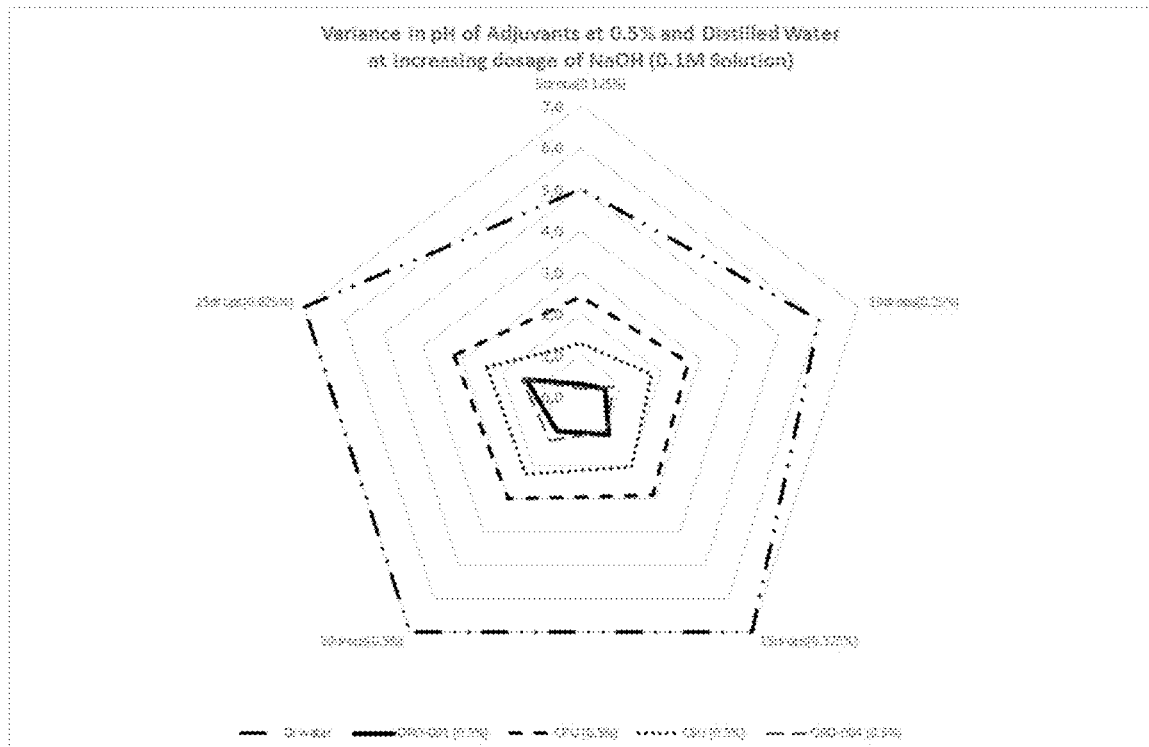
FIG. 7 is a graph depicting the buffering characteristics of the embodiments of the adjuvant concentrate compared to two commercial products, evaluating the behavior in distillated water and the pH variation during successive additions of known portions of a solution of NaOH at 0.1M. The portions are added to a solution of 0.5% of each adjuvant. Each adjuvant is prepared in distillated water. From outermost to innermost pentagon: Distilled Water (DI water), CPU (0.5%), CSU (0.5%), ORO-001 (0.5%), and ORO-004 (0.5%)
Figure 8:
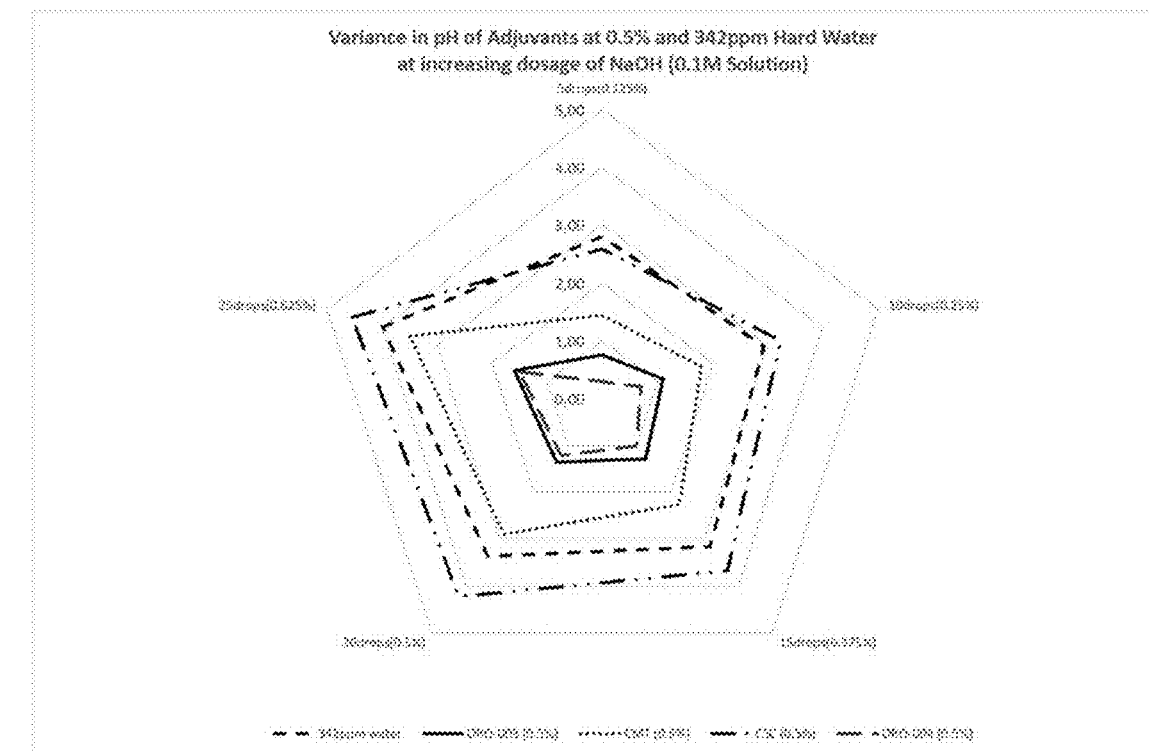
FIG. 8 is a graph depicting the buffering characteristics of two of the embodiments of the adjuvant concentrate compared to two commercial products, evaluating the behavior in hard water at 342 ppm and the pH variation during successive additions of known parts of a solution of NaOH at 0.1M, added to a solution of 0.5% of each adjuvant. Each adjuvant is prepared in distillated water. From outermost to innermost pentagon: CSC (0.5%), 342 ppm water, CMT (0.5%), ORO-003 (0.5%), and ORO-004 (0.5%)

The production and use of a stable emulsified adjuvant with pH buffer capabilities are provided.

The concentrated stable emulsified adjuvant comprising combining at least one alkyl benzene sulfonic acid neutralized with a base from amine tertiary group and one or more oils wherein the concentrates are stable as a concentrate or in tank mix designed to stabilize the pH into the accelerate penetration of the emulsion into a plant particularly when it is diluted in water or other chemistries, said adjuvant emulsified having pH buffer capabilities.

Definitions

The term "adjuvant" as used herein is a broad term, and is to be given its ordinary and customary meaning to a person of ordinary skill in the art (and is not to be limited to a special or customized meaning), and refers without limitation to an agent that modifies the effect of other agents and more particularly used to enhance the effectiveness of pesticides such as herbicides, insecticides, fungicides and other agents The term "lipid" as used herein is a broad term, and is to be given its ordinary and customary meaning to a person of ordinary skill in the art (and is not to be limited to a special or customized meaning), and refers without limitation to saturated and unsaturated oils and waxes, esters, amides, glycerides, fatty acids, fatty alcohols, sterol and sterol esters, tocopherols, carotenoids, among others.

The term "stable" as used herein is a broad term, combined or related with the term "emulsion", and is to be given its ordinary and customary meaning to a person of ordinary skill in the art (and is not to be limited to a special or customized meaning), and refers without limitation to the emulsion stability, i.e. the ability of an emulsion to resist change in its properties over time so that the size of the droplets in emulsion does not change significantly with time, more specifically during the time of an application to the targets mixed with water, it is thus to be given its ordinary meaning that is customary to a person skilled in the art.

The term "solvents" as used herein is a broad term, and is to be given its ordinary and customary meaning to a person of ordinary skill in the art (and is not to be limited to a special or customized meaning), and refers without limitation to compounds with some characteristics of solvency for other compounds or means, that can be polar or non-polar, linear or branched, cyclic or aliphatic, aromatic, naphthenic and that includes but is no limited to: alcohols, esters, diesters, ketones, acetates, terpenes, sulfoxides, glycols, paraffins, hydrocarbons, anhydrides, heterocyclics, among others.

The term "amphipathic" as used herein is a broad term, and is to be given its ordinary and customary meaning to a person of ordinary skill in the art (and is not to be limited to a special or customized meaning), and refers without limitation to compounds with some hydrophilic and hydrophobic characteristics, which allows them to surround non-polar substances like oil, grease or wax, isolating them from water.

Whenever a group is described as being "optionally substituted" that group may be unsubstituted or substituted with one or more of the indicated substituents. Likewise, when a group is described as being "unsubstituted or substituted" if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, mercapto, alkylthio, arylthio, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, a mono-substituted amino and a di-substituted amino group, and protected derivatives thereof.

The term "alkyl" as used herein is a broad term, and is to be given its ordinary and customary meaning to a person of ordinary skill in the art (and is not to be limited to a special or customized meaning), and refers without limitation to a straight chain or branched, acyclic or cyclic, unsaturated or saturated aliphatic hydrocarbon containing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more carbon atoms, while the term "lower alkyl" has the same meaning as alkyl but contains 1, 2, 3, 4, 5, or 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl," respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like. Typical alkyl groups include, but are in no way limited to, methyl, ethyl, propyl, isopropyl, butyl, isobutyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, henatriacontyl, dotriacontyl, tritriacontyl, tetratriacontyl, pentatriacontanyl, and hexatriacontanoic. The alkyl group may be substituted or unsubstituted.

The term "cycloalkyl" as used herein is a broad term, and is to be given its ordinary and customary meaning to a person of ordinary skill in the art (and is not to be limited to a special or customized meaning), and refers without limitation to alkyls that include mono-, di-, or poly-homocyclic rings. Cycloalkyls are also referred to as "cyclic alkyls" or "homocyclic rings." Representative saturated cyclic alkyls include cyclopropyl, cyclobutyl, cyclopentyl, cyclohexyl, —CH$_2$cyclopropyl, —CH$_2$cyclobutyl, —CH$_2$cyclopentyl, —CH$_2$cyclohexyl, and the like; while unsaturated cyclic alkyls include cyclopentenyl and cyclohexenyl, and the like. Cyclic alkyls include decalin, adamantane, and the like.

The term "aryl" as used herein is a broad term, and is to be given its ordinary and customary meaning to a person of ordinary skill in the art (and is not to be limited to a special or customized meaning), and refers without limitation to an aromatic carbocyclic moiety such as phenyl or naphthyl.

The term "arylalkyl" as used herein is a broad term, and is to be given its ordinary and customary meaning to a person of ordinary skill in the art (and is not to be limited to a special or customized meaning), and refers without limitation to an alkyl having at least one alkyl hydrogen atom replaced with an aryl moiety, such as benzyl, —CH$_2$(1-naphthyl), —CH$_2$(2-naphthyl), —(CH$_2$)$_2$phenyl, —(CH$_2$)$_3$phenyl, —CH(phenyl)$_2$, and the like.

The term "heteroaryl" as used herein is a broad term, and is to be given its ordinary and customary meaning to a person of ordinary skill in the art (and is not to be limited to a special or customized meaning), and refers without limitation to an aromatic heterocycle ring of 5 or 6 to 7, 8, 9, 10, 11, or 12 members and having at least one heteroatom (or 2, 3, or 4 or more heteroatoms) selected from nitrogen, oxygen, and sulfur, and containing at least one carbon atom, including both monocyclic and bicyclic ring systems. Representative heteroaryls include (but are not limited to) furyl, benzofuranyl, thiophenyl, benzothiophenyl, pyrrolyl, indolyl, isoindolyl, azaindolyl, pyridyl, quinolinyl, isoquinolinyl, oxazolyl, isooxazolyl, benzoxazolyl, pyrazolyl, imidazolyl, benzimidazolyl, thiazolyl, benzothiazolyl, isothiazolyl, pyridazinyl, pyrimidinyl, pyrazinyl, triazinyl, cinnolinyl, phthalazinyl, and quinazolinyl.

The term "heteroarylalkyl" as used herein is a broad term, and is to be given its ordinary and customary meaning to a person of ordinary skill in the art (and is not to be limited to a special or customized meaning), and refers without limitation to an alkyl having at least one alkyl hydrogen atom replaced with a heteroaryl moiety, such as —CH$_2$pyridinyl, —CH$_2$pyrimidinyl, and the like.

The terms "heterocyclic", "heterocycle" and "heterocycle ring" as used herein are broad terms, and are to be given their ordinary and customary meaning to a person of ordinary skill in the art (and are not to be limited to special or customized meanings), and refer without limitation to a 5, 6, or, 7 membered monocyclic heterocyclic ring, or a 7, 8, 9, 10, 11, 12, 13, or 14 or more membered polycyclic heterocyclic ring. The ring can be saturated, unsaturated, aromatic, or nonaromatic, and can contain 1, 2, 3, or 4 or more heteroatoms independently selected from nitrogen, oxygen, and sulfur. The nitrogen and sulfur heteroatoms may be optionally oxidized, and the nitrogen heteroatom may be optionally quaternized, including bicyclic rings in which any of the above heterocycles are fused to a benzene ring as well as tricyclic (and higher) heterocyclic rings. The heterocycle can be attached via any heteroatom or carbon atom of the ring or rings. Heterocycles include heteroaryls as defined above. Thus, in addition to the aromatic heteroaryls listed above, heterocycles also include (but are not limited to) morpholinyl, pyrrolidinonyl, pyrrolidinyl, piperidinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like.

The term "heterocyclealkyl" as used herein is a broad term, and is to be given its ordinary and customary meaning to a person of ordinary skill in the art (and is not to be limited to a special or customized meaning), and refers without limitation to an alkyl having at least one alkyl hydrogen atom replaced with a heterocycle, such as —$CH_2$-morpholinyl, and the like.

The term "substituted" as used herein is a broad term, and is to be given its ordinary and customary meaning to a person of ordinary skill in the art (and is not to be limited to a special or customized meaning), and refers without limitation to any of the above groups (e.g., alkyl, aryl, arylalkyl, heteroaryl, heteroarylalkyl, heterocycle or heterocyclealkyl) wherein at least one hydrogen atom is replaced with a substituent. In the case of a keto substituent (i.e., —C(=O)—) two hydrogen atoms are replaced. When substituted, "substituents," within the context of preferred embodiments, include halogen, hydroxy, cyano, nitro, phenol, amino, sorbitan, alkylamino, dialkylamino, alkyl, alkoxy, alkylthio, haloalkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl, substituted heterocyclealkyl, —$NR_aR_b$, —$NR_aC(=O)R_b$, —$NR_aC(=O)NR_bR_c$, —$NR_aC(=O)OR_b$, —$NR_aSO_2R_b$, —$OR_a$, —$C(=O)R_a$, —$C(=O)OR_a$, —$C(=O)NR_aR_b$, —$OC(=O)NR_aR_b$, —SH, —$SR_a$, —$SOR_a$, —$S(=O)_2R_a$, —$OS(=O)_2R_a$, —$S(=O)_2OR_a$, wherein $R_a$, $R_b$, and $R_c$ are the same or different and are independently selected from hydrogen, alkyl, haloalkyl, substituted alkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl or substituted heterocyclealkyl.

The term "halogen" as used herein is a broad term, and is to be given its ordinary and customary meaning to a person of ordinary skill in the art (and is not to be limited to a special or customized meaning), and refers without limitation to fluoro, chloro, bromo, and iodo.

The term "haloalky" as used herein is a broad term, and is to be given its ordinary and customary meaning to a person of ordinary skill in the art (and is not to be limited to a special or customized meaning), and refers without limitation to an alkyl having at least one hydrogen atom replaced with halogen, such as trifluoromethyl and the like.

The term "alkoxy" as used herein is a broad term, and is to be given its ordinary and customary meaning to a person of ordinary skill in the art (and is not to be limited to a special or customized meaning), and refers without limitation to an alkyl moiety attached through an oxygen bridge (i.e., —O-alkyl) such as methoxy, ethoxy, and the like.

The term "thioalkyl" as used herein is a broad term, and is to be given its ordinary and customary meaning to a person of ordinary skill in the art (and is not to be limited to a special or customized meaning), and refers without limitation to an alkyl moiety attached through a sulfur bridge (i.e., —S-alkyl) such as methylthio, ethylthio, and the like.

The term "alkylsulfonyl" as used herein is a broad term, and is to be given its ordinary and customary meaning to a person of ordinary skill in the art (and is not to be limited to a special or customized meaning), and refers without limitation to an alkyl moiety attached through a sulfonyl bridge (i.e., —$SO_2$-alkyl) such as methylsulfonyl, ethylsulfonyl, and the like.

The terms "alkylamino" and "dialkyl amino" as used herein are broad terms, and are to be given their ordinary and customary meanings to a person of ordinary skill in the art (and are not to be limited to special or customized meanings), and refer without limitation to one alkyl moiety or two alkyl moieties, respectively, attached through a nitrogen bridge (i.e., —N-alkyl) such as methylamino, ethylamino, dimethylamino, diethylamino, and the like.

The term "alkylphenol" as used herein is a broad term, and is to be given its ordinary and customary meaning to a person of ordinary skill in the art (and is not to be limited to a special or customized meaning), and refers without limitation to an alkyl substituted with at least one phenol group The term "hydroxyalkyl" as used herein is a broad term, and is to be given its ordinary and customary meaning to a person of ordinary skill in the art (and is not to be limited to a special or customized meaning), and refers without limitation to an alkyl substituted with at least one hydroxyl group.

The term "mono- or di-(cycloalkyl) methyl" as used herein is a broad term, and is to be given its ordinary and customary meaning to a person of ordinary skill in the art (and is not to be limited to a special or customized meaning), and refers without limitation to a methyl group substituted with one or two cycloalkyl groups, such as cyclopropylmethyl, dicyclopropylmethyl, and the like.

The term "alkylcarbonylalkyl" as used herein is a broad term, and is to be given its ordinary and customary meaning to a person of ordinary skill in the art (and is not to be limited to a special or customized meaning), and refers without limitation to an alkyl substituted with a —C(=O)-alkyl group.

The term "alkylcarbonyloxyalkyl" as used herein is a broad term, and is to be given its ordinary and customary meaning to a person of ordinary skill in the art (and is not to be limited to a special or customized meaning), and refers without limitation to an alkyl substituted with a —C(=O)O-alkyl group or a —OC(=O)-alkyl group.

The term "alkyloxyalkyl" as used herein is a broad term, and is to be given its ordinary and customary meaning to a person of ordinary skill in the art (and is not to be limited to a special or customized meaning), and refers without limitation to an alkyl substituted with an —O-alkyl group.

The term "alkylthioalkyl" as used herein is a broad term, and is to be given its ordinary and customary meaning to a person of ordinary skill in the art (and is not to be limited to a special or customized meaning), and refers without limitation to an alkyl substituted with a —S-alkyl group.

The term "mono- or di-(alkyl) amino" as used herein is a broad term, and is to be given its ordinary and customary meaning to a person of ordinary skill in the art (and is not to be limited to a special or customized meaning), and refers without limitation to an amino substituted with one alkyl or with two alkyls, respectively.

The term "mono- or di-(alkyl) amino alkyl" as used herein is a broad term, and is to be given its ordinary and customary meaning to a person of ordinary skill in the art (and is not to be limited to a special or customized meaning), and refers without limitation to an alkyl substituted with a mono- or di-(alkyl) amino.

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "ester" as used herein is a broad term, and is to be given its ordinary and customary meaning to a person of ordinary skill in the art (and is not to be limited to a special or customized meaning), and refers without limitation to any compound as described herein incorporating one or more ester groups, e.g., monoester, diester, triester, or polyester, or being substituted by or functionalized to include one or more ester groups. Esters include but are not limited to fatty acid esters.

The term "acetates" as used herein is a broad term, and is to be given its ordinary and customary meaning to a person of ordinary skill in the art (and is not to be limited to a special or customized meaning), and refers without limitation to any compound as described herein incorporating one or more acetate groups, such as salts, esters or other compounds incorporating a $CH_3COO-$ moiety.

The term "terpenes" as used herein is a broad term, and is to be given its ordinary and customary meaning to a person of ordinary skill in the art (and is not to be limited to a special or customized meaning), and refers without limitation to any compound as derived from resins of plants such as conifers, or to synthetically produced compounds having the same structures as plant derived terpenes. Terpenes can include hydrocarbons as well as terpenoids containing additional functional groups, as well as essential oils. Terpenes can include compounds having a formula $(C_5H_8)_n$ where n is the number of linked isoprene units (e.g., 1, 2, 3, 4, 5, 6, 7, 8, 9, 10, or more).

The term "terpene containing natural oil" as used herein is a broad term, and is to be given its ordinary and customary meaning to a person of ordinary skill in the art (and is not to be limited to a special or customized meaning), and refers without limitation to a natural oil containing at least 50% of a terpene selected from but not exclusively from the group consisting of orange oil, grapefruit oil, lemon oil, lime oil, tangerine oil, and pine oil or components thereof.

The term "sulfoxides" as used herein is a broad term, and is to be given its ordinary and customary meaning to a person of ordinary skill in the art (and is not to be limited to a special or customized meaning), and refers without limitation to any compound as described herein incorporating one or more sulfinyl (SO) groups, or being substituted by or functionalized to include one or more sulfinyl groups.

The term "glycols" as used herein is a broad term, and is to be given its ordinary and customary meaning to a person of ordinary skill in the art (and is not to be limited to a special or customized meaning), and can include diols, e.g., polyalkylene glycols such as polyethylene glycols (polymers having the formula $H(OCH_2CH_2)_nOH$ where n is greater than three), polypropylene glycols, or glycols incorporating monomers comprising longer hydrocarbon chains.

The term "paraffins" as used herein is a broad term, and is to be given its ordinary and customary meaning to a person of ordinary skill in the art (and is not to be limited to a special or customized meaning), and refers without limitation to heavier alkanes, such as alkanes forming a liquid or wax at room temperature, as well as functionalized paraffins, e.g., chlorinated paraffins, and mineral or synthetic oils comprising hydrocarbons. Room temperature as used herein refers to ambient conditions, e.g., in a climate controlled building, for example, approximately 20° C.

The term "hydrocarbons" as used herein is a broad term, and is to be given its ordinary and customary meaning to a person of ordinary skill in the art (and is not to be limited to a special or customized meaning), and refers without limitation to any compound comprising only carbon and hydrogen atoms. A functionalized or substituted hydrocarbon has one or more substituents as described elsewhere herein.

The term "anhydrides" as used herein is a broad term, and is to be given its ordinary and customary meaning to a person of ordinary skill in the art (and is not to be limited to a special or customized meaning), and refers without limitation to any compound as described herein incorporating one or more anhydride groups (of formula $(RC(O))_2O$), or being substituted by or functionalized to include one or more anhydride groups.

The term "sulfonic acid" as used herein is a broad term, and is to be given its ordinary and customary meaning to a person of ordinary skill in the art (and is not to be limited to a special or customized meaning), and refers without limitation to, for example formic, acetic, succinic, lactic, malic, tartaric, citric, ascorbic, nicotinic, methanesulfonic, ethanesulfonic, p-toluenesulfonic, salicylic or naphthalene sulfonic acid. Sulfonic acids can include hydrocarbyl sulfonic acids, such as aryl sulfonic acids, alkyl benzene sulfonic acid, among other.

The term "vegetable oil" as used herein is a broad term, and is to be given its ordinary and customary meaning to a person of ordinary skill in the art (and is not to be limited to a special or customized meaning), and refers without limitation to oleaginous fatty acid constituents of vegetable matter, e.g., saturated fatty acids, monounsaturated fatty acids, polyunsaturated fatty acids, etc. The vegetable oil can be functionalized, e.g., alkoxylated, hydroxylated, aminated, etc. A functionalized vegetable oil is a derivative of a vegetable oil or other fatty substance, or a substance having a similar composition regardless of the origin of the substance. In some embodiments, the functionalized vegetable oil is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C=C moieties of the parent unsaturated fatty acid triglyceride is replaced with an epoxide moiety (i.e. a three-membered ring containing an oxygen). If the parent unsaturated fatty acid triglyceride has more than one C=C moiety, one, part, or all of the C=C moieties may be replaced by epoxide moieties. When the term "vegetable oil" is used herein, it is understood to include animal fats, or oils of synthetic origin, having a same chemical structure as a vegetable oil. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, or the like.

As used herein, the abbreviations for any compound, is, unless indicated otherwise, in accord with its common usage, recognized abbreviations, or the IUPAC-IUB Commission on Biochemical Nomenclature (See, Biochem. 11:942-944 (1972)).

Any percentages, ratios or other quantities referred to herein are on a weight basis, unless otherwise indicated.

The cyclic systems referred to herein include fused ring, bridged ring, and spiro ring moieties, in addition to isolated monocyclic moieties.

EXAMPLES

Method of Preparation of the Concentrate

For the purpose of illustration, the method for preparing the concentrate as used in the non-limiting examples is by admixing one or more natural or synthetic oils such as methylated seed oil (such as methylated soybean oil), pure or mixed with another methylated seed oil or other oil, and a second component such as a alkyl benzene sulfonic acid such as DDBSA, neutralizing the acid with a base such as tertiary amine preferably triethanolamine (TEA) so as to provide a composition with an acid pH value of about 5, stirring the mixture while heating it up to a temperature of between 5 and 50° C. Heating is not necessarily required, but may advantageously be employed depending on the physical state of each compound. For certain components, lower temperatures or higher temperatures may be employed. The temperature can be selected so as to facilitate mixing within a desired time period, while avoiding degradation or undesired reaction of the components. Other additives can be used for specific purposes, such as preservatives, clarifiers, alcohols, anti-foaming agents, silicones, anti-freezing agents, hydrotopes, UV stabilizers, and even water, and/or other additives as are typically employed in adjuvant compositions.

The adjuvant concentrate composition may comprise various ratios of components, typically from 2 to 100 parts by weight natural or synthetic oil to 1 part by weight alkyl benzene sulfonic acid; said adjuvant concentrate being neutralized with 1 part by weight alkyl benzene sulfonic acid to from 0.1 to 3 parts by weight tertiary amine as base. In certain embodiments, higher or lower ratios may be employed. Water and other additives are not included in the calculation of the ratio. The adjuvant composition so prepared is a concentrate which is readily dispersible in water or other chemistries with high solvency which remains in stable emulsion.

The stable emulsion of the adjuvant concentrate has an pH zone of between 4 to 8, but preferably a pH of 4 to 7, and more preferably between 5 to 6.

Preparing the Adjuvants

Four different adjuvant concentrates were prepared according to some of the embodiments. The concentrates are indicated by ORO-001, ORO-002, ORO-003 and ORO-004. The details of the specific embodiment of alkylated seed oil- and orange oil-based adjuvants with buffer capacity are described in Table 1. Various components were employed in the different formulations, including Stepan's Company TOXIMUL® 8241—castor oil ethoxylated, POE-30—nonionic surfactant; NINATE® 60 E—dodecyl benzene sulfonic acid calcium salt—anionic surfactant; Univar's Company VANWET® ACID 98—linear dodecyl benzene sulfonic acid; UREIA TECNICA®—technical urea; Cargill's Company CARGILL® METHYL SOYATE—soy bean methyl ester; QGP's Company ESTER METILICO DE OLEO DE MAMONA®—castor oil methyl ester; PROXEL GXL®—a 20% aqueous dipropylene glycol solution of 1,2-benzisothiazolin-3-one; Dow Chemical's Company TERGITOL® 15-S-9—a secondary alcohol ethoxylate, nonionic surfactant; TEA 98®—a tertiary amine—Triethanolamine 98%; ECOSURF® EH-9—alcohol ethoxylated and propoxylated, nonionic surfactant; OLA001 OLEO ESSENCIAL DE LARANJA®—essential orange oil; BHT FEED GRADE®—butyl hydroxyl toluene; Wacker's Company SILFOAM® SE-3060-30% active, food-grade silicone emulsion.

TABLE 1

Adjuvant Concentrates

| Compound (Brand Name) | Amount (weight/weight %) | | | |
|---|---|---|---|---|
| | ORO-001 | ORO-002 | ORO-003 | ORO-004 |
| Alkylated Seed Oil 1 (CARGILL ® METHYL SOYATE) | 64.00 | — | 67.30 | 50.00 |
| Alkylated Seed Oil 2 (ESTER METILICO DE OLEO DE MAMONA ®) | — | 73.40 | — | 20.00 |
| Alkyl Benzene Sulfonic Acid (VANWET ® ACID 98) | 10.50 | 5.80 | 10.50 | 8.00 |
| Natural Oil 3 (OLA001 OLEO ESSENCIAL DE LARANJA ®) | 2.95 | 4.20 | 3.50 | 3.00 |
| Terciary Amine (TEA 99 ®) | 5.25 | 2.40 | 5.50 | 3.00 |
| Alkohol Ethoxylated (TERGITOL 15-S-9 ®) | 10.90 | — | — | 3.00 |
| Fatty Acid Ethoxylated (TOXIMUL 8241 ®) | — | 8.00 | — | — |
| Alkyl Benzene Sulfonated Salt (NINATE ® 60 E) | — | — | — | 2.00 |
| Alkohol Ethoxylated and Propoxylated (ECOSURF EH-9 ®) | — | — | 7.00 | 6.00 |
| WATER | 3.20 | 3.90 | 2.90 | 2.00 |
| Hydrotrope Agent (UREIA TECNICA ®) | 2.90 | 2.00 | 3.00 | 2.70 |
| UV Antioxidant (BHT FEED GRADE ®) | 0.10 | 0.10 | 0.10 | 0.10 |
| Preservant Agent (PROXEL GXL ®) | 0.10 | 0.10 | 0.10 | 0.10 |
| Antifoam Agent (SILFOAM SE-3060 ®) | 0.10 | 0.10 | 0.10 | 0.10 |
| RATIO Oil:DDBS (Weight) | 6.4:11 | 13.4:1 | 6.7:1 | 9.1:1 |
| RATIO DDBS:TEA (Weight) | 2.0:1 | 2.4:1 | 1.9:1 | 2.6:1 |

Physical Chemical and Accelerated Stability Tests

Samples of products of certain embodiments were compared to commercially available products and analyzed to determine their physical chemical characteristics and their behavior when diluted in water—pH and stability of emulsion, using methodology described on CIPAC Handbook F—Collaborative International Pesticide Analytical Ltd, 1994, reprint in 2007, the contents of which are hereby incorporated by reference in their entirety. These commercially available products included Methylated Seed Oil over 70% available from Monterrey Ag Resources (CMT); Methylated Seed Oil over 70% available from United Suppliers (CSC); High Surfactant Methylated Seed Oil 60% available from United Suppliers (CSU); and MSO 85% available from Precision Laboratories (CPU). It was determined that the products prepared according to the embodiments exhibited stability in accelerated storage stability testing, and all samples were stable even in cold or hot conditions. The stability results are shown in Table 2 and Table 3.

TABLE 2

Physical and Chemical and Accelerated Stability Tests results

| ANALYSIS | ORO-001 | ORO-002 | ORO-003 | ORO-004 |
|---|---|---|---|---|
| Appearance (product) | Clear Golden Liquid | Clear Golden Liquid | Clear Golden Liquid | Clear Golden Liquid |
| Density @ 20° C. | 0.9293 | 0.9080 | 0.9110 | 0.9012 |
| pH (product) | 5.80 | 6.09 | 5.93 | 3.20 |
| pH (0.5% v/v) | 5.60 | 6.24 | 6.20 | 4.10 |
| Viscosity @ 25° C. | 25 cP | 34 cP | 38 cP | 20 cP |
| Appearance (solution at 0.25%-distillated water) | Cloudy | Cloudy | Cloudy | Cloudy |
| Emulsion Stability (CIPAC MT 36) 1% v/v 2 hours @ 30° C. Water CIPAC A and D | No cream and No Oil | No cream and No Oil | No cream and No Oil | No cream and No Oil |
| Emulsion Stability Method CIPAC MT 36 1% v/v 24 h 30 hours re-emulsified at 30° C. Water CIPAC A and D | No cream and No Oil | No cream and No Oil | No cream and No Oil | No cream and No Oil |
| Accelerated Storage Procedure Method CIPAC MT 46 (14 days at 5, 20 and 54° C.) | Stable | Stable | Stable | Stable |

TABLE 3

Physical and Chemical Results for Commercially Available Products

| ANALYSIS | CMT | CSC | CSU | CPU |
|---|---|---|---|---|
| Appearance (product) | Clear Golden Liquid | Clear Golden Liquid | Clear Golden Liquid | Clear Golden Liquid |
| Density @ 20° C. | 0.9044 | 0.9069 | 0.9174 | 0.8940 |
| pH (0.5% v/v) | 6.07 | 5.93 | 5.20 | 6.30 |
| Appearance (solution at 0.25%-distillated water) | Cloudy | Cloudy | Cloudy | Cloudy |
| Emulsion Stability (CIPAC MT 36) 1% v/v 2 hours @ 30° C. Water CIPAC A and D | 0.1% cream and No Oil | 0.1% cream and No Oil | Traces of cream and No Oil | Traces of cream and No Oil |
| Emulsion Stability Method CIPAC MT 36 1% v/v 24 h 30 hours re-emulsified at 30° C. Water CIPAC A and D | 0.3% cream and Traces of Oil | 0.2% cream and Traces of Oil | Traces of cream and No Oil | Traces of cream and No Oil | pH Test—Buffer Properties

The pH buffer properties and values of adjuvants according to the embodiments were compared with four products commercially available.

Sample Preparation: A known quantity of the product sample was weighed and measured against a known portion of deionized water or hard water forming an emulsion.

Added to the emulsion was a known quantity of a solution of sodium hydroxide 0.1M, the pH value was read and evaluated in graphic format to illustrate the buffer properties of the exemplary adjuvants when compared to the poor performance from the tested commercially available products.

The samples of the exemplary adjuvants are indicated by samples ORO-001 to ORO-004 respectively. From the results it can be seen that the exemplary adjuvants, as illustrated by the specific examples of alkylated seed oil based adjuvants, performed much better than the commercially available tested products in buffering the pH value to neutral. It was observed in all samples of the exemplary adjuvants that even when using a high amount of a strong base, the pH value remains completely within the neutral to acid zone.

FIGS. 1 to 8 illustrate the various buffer tests conducted for an adjuvant in accordance with one embodiment when compared to commercially available products. It is clear to a person of ordinary skill in the art that the product made according to this embodiment has significantly better buffer properties compared to products commercially available or from the prior art.

Uptake and Translocation Test

Figure 9:
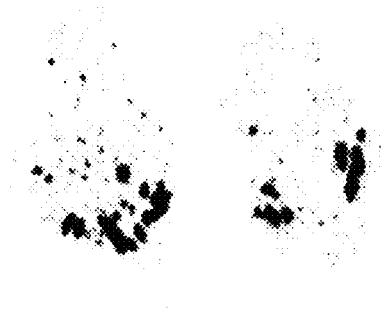
FIG. 9 is radioactive C-14 imagery illustrating the accelerated penetration of the adjuvant emulsion into a plant (Lambs quarter weeds), comparing an exemplary adjuvant concentrate to two commercial products, with images taken 15 minutes post treatment. It shows visually how much active material (C-14 material) was absorbed by the leaf.
Figure 9:
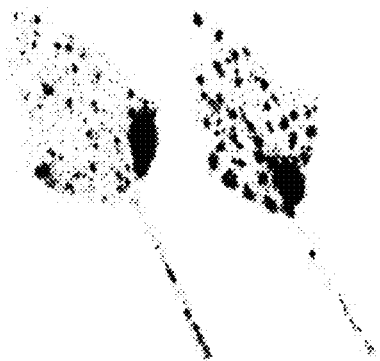
Figure 9:
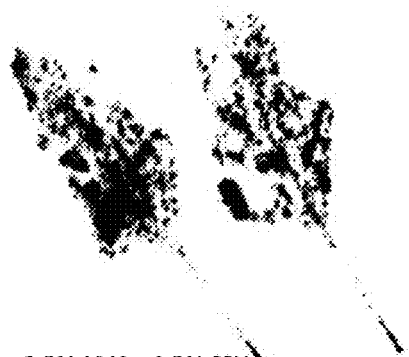
Figure 9:
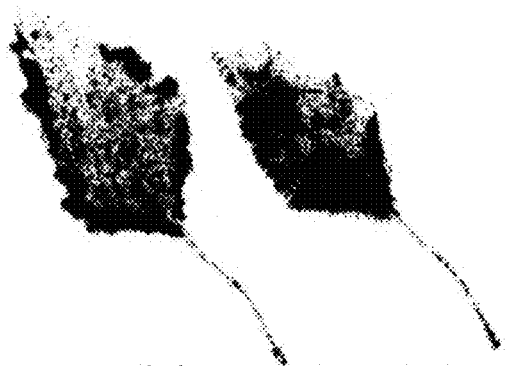
Figure 10:
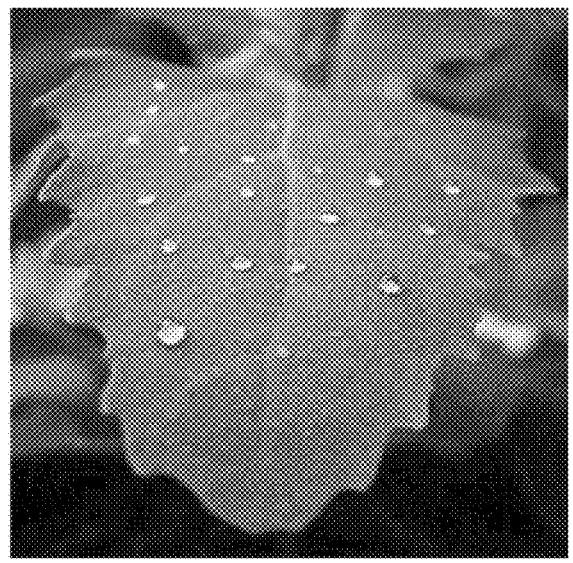
FIG. 10 is the Dispersion and Evaporation Droplet test on the leaf surface using Glyphosate plus Ammonium Sulfate (AMS) at 2.5%. The imagery illustrates the accelerated penetration of the adjuvant emulsion into a plant applied on the adaxial part of the Leaf, with images taken at zero and 15 minutes post treatment. It visually presents the performance of the droplets absorbed by the leaf 15 minutes post treatment.
Figure 10:
Figure 11:
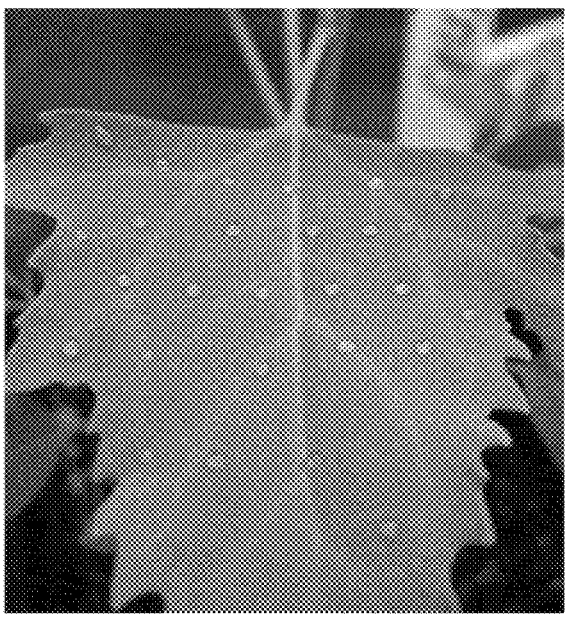
FIG. 11 is the Dispersion and Evaporation Droplet test on the leaf surface using Glyphosate plus Ammonium Sulfate (AMS) at 2.5% plus CPU at 0.5%. The imagery illustrates the accelerated penetration of the adjuvant emulsion into a plant applied on the adaxial part of the Leaf, with images taken at zero and 15 minutes post treatment. It visually presents the performance of the droplets absorbed by the leaf 15 minutes post treatment when the product CPU is used as tank mix adjuvant.
Figure 11:
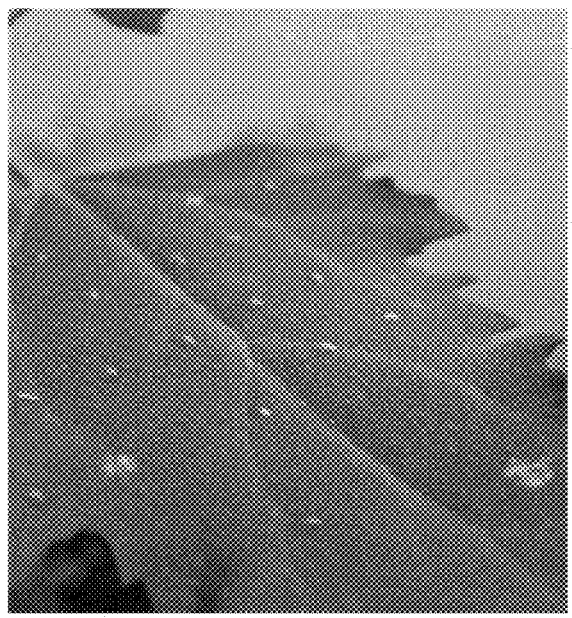
Figure 12:
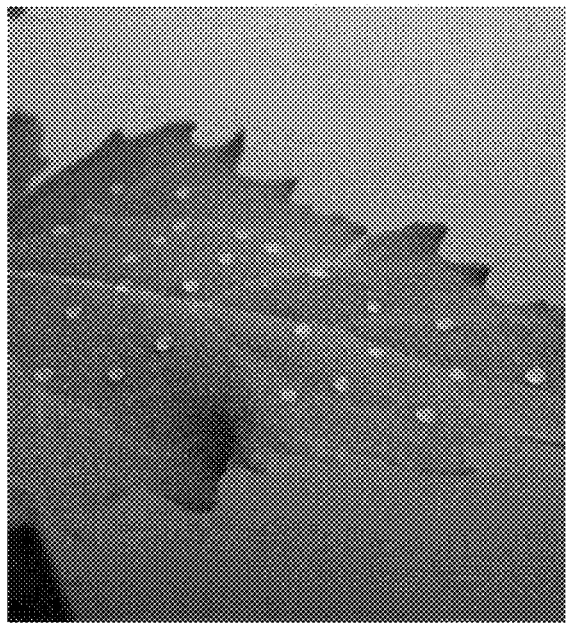
FIG. 12 is the Dispersion and Evaporation Droplet test on the leaf surface using Glyphosate plus Ammonium Sulfate (AMS) at 2.5% plus CSU at 0.5%. The imagery FIG. 12 illustrating the accelerated penetration of the adjuvant emulsion into a plant applied on the adaxial part of the Leaf, with images taken at zero and 15 minutes post treatment. It visually presents the performance of the absorbed by the leaf 15 minutes post treatment when the product CSU is used as tank mix adjuvant.
Figure 12:
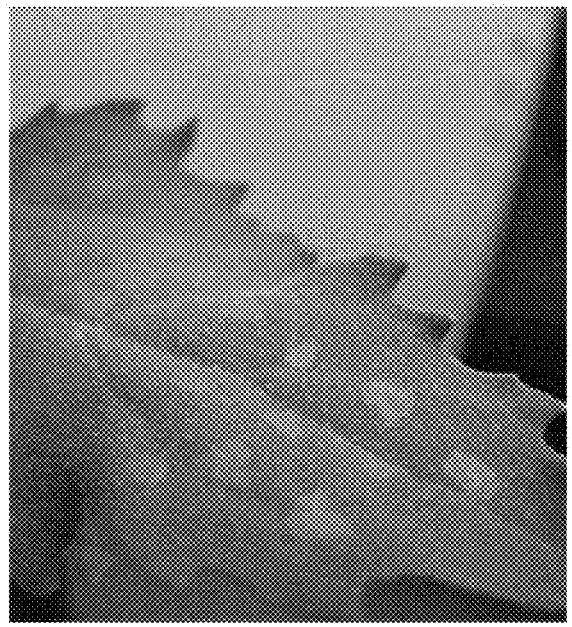

The translocation of an active agent to a target site was investigated by adding the emulsified alkylated seed oil-based adjuvant concentrates with buffer properties from one of the exemplary embodiments to a known pesticide, more specifically to an herbicide Glyphosate (Roundup® Power-Max® from Monsanto®) and applying it to a Lambsquarter plant. Evaluating FIG. 9, it is clear that the exemplary adjuvant concentrates, when applied as an herbicide carrier, have the ability to translocate the herbicide through the plants more effectively and without negatively affecting the plant or the performance of the herbicide because of this buffer capability. The alkylated seed oil based buffered adjuvants of exemplary embodiments not only created a stable emulsion and buffered the tank-mixed products, but also delivering the active ingredient through the epicutular wax and stomata of the plant to improve rain fastness.

Dispersion and Evaporation of Droplets Test

The dispersion and evaporation of droplets and the relative distribution of an active agent to a target site was investigated by adding the emulsified alkylated seed oil-based adjuvant concentrates with buffer properties from one of the exemplary embodiments to a known pesticide, more specifically to an herbicide Glyphosate (Roundup® Power-max® from Monsanto®) plus 2.5% of Ammonium Sulfate (AMS) and applying the solution on the Lambsquarter plant over the adaxial surface of a leaf under environmental conditions controlled (20° C. and 60% Humidity Relative), comparing an exemplary adjuvant concentrate to two commercial products, with images taken at zero and 15 minutes post treatment.

It is clear from FIGS. 10 to 13 that the exemplary adjuvant concentrates, when applied as an herbicide carrier, have the ability to spread and penetrate the target pest or plant due to the stability of the emulsified adjuvant with buffer capability. The alkylated seed oil based buffered adjuvant of the exemplary embodiments not only created a stable emulsion and buffered the tank-mixed products, but accelerated the penetration time through the epicutular wax and stomata of the plant to improve rain fastness.

Figure 13:
FIG. 13 is the Dispersion and Evaporation Droplet test on the leaf surface using Glyphosate plus Ammonium Sulfate (AMS) at 2.5% plus ORO-001 at 0.5% The imagery FIG. 13 illustrating the accelerated penetration and better spreading of the adjuvant emulsion into a plant applied on the adaxial part of the Leaf, with images taken at zero and 15 minutes post treatment. It visually presents the performance of the droplets absorbed by the leaf 15 minutes post treatment when the product from the embodiments ORO-001 is used as tank mix adjuvant.
Figure 13:
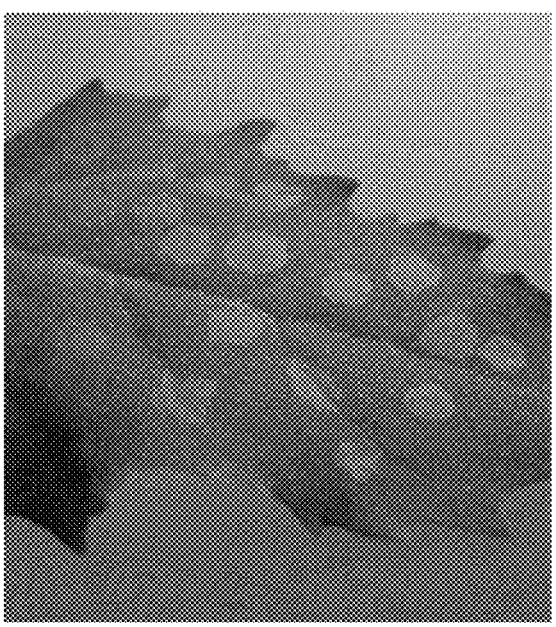

The imagery of FIG. 13 illustrates the accelerated penetration and improved spreading of the adjuvant emulsion into a plant applied on the adaxial part of the leaf. FIG. 13 visually presents the performance of the droplets that was absorbed by the leaf 15 minutes post treatment and the Uptake and Translocation Test results using C-14 radioactive compound undeniably demonstrates the capability and speed of loading the active ingredient into the plant through the epicutular wax. It is clear that the product made according to the embodiments improves rain fastness. The area of penetration is also larger than when compared to the commercially available products.

While the invention has been illustrated and described in detail in the drawings and foregoing description, such illustration and description are to be considered illustrative or exemplary and not restrictive. The invention is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in this specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A stable, buffered, emulsifiable, oil-based adjuvant concentrate, comprising:
   64 wt. % of a soybean methyl ester;
   10.5 wt. % of an alkyl benzene sulfonic acid;
   2.95 wt. % of an orange oil;
   5.25 wt. % of a tertiary amine pH adjuster;
   10.9 wt. % of an ethoxylated alcohol; and
   3.2 wt. % water,
   wherein the stable, buffered, emulsifiable, oil-based adjuvant concentrate is adapted to yield, when diluted, a composition having a buffered pH value of from 4 to 8.

2. The stable, buffered, emulsifiable, oil-based adjuvant concentrate of claim 1, further comprising 2.9 wt. % urea; 0.1 wt. % butyl hydroxy toluene; 0.1 wt. % of a 20% aqueous dipropylene glycol solution of 1,2-benzisothiazolin-3-one; and 0.1 wt. % of a 30% active, food-grade silicone emulsion.

3. The stable, buffered, emulsifiable, oil-based adjuvant concentrate of claim 2, wherein the tertiary amine is triethanolamine.

4. The stable, buffered, emulsifiable, oil-based adjuvant concentrate of claim 1, wherein the alkyl benzene sulfonic acid is a linear dodecyl benzene sulfonic acid.

5. A stable, buffered, emulsifiable, oil-based adjuvant concentrate, comprising:
   67.30 wt. % of a soybean methyl ester;
   10.5 wt. % of an alkyl benzene sulfonic acid;
   3.50 wt. % of an orange oil;
   5.50 wt. % of a tertiary amine pH adjuster;
   7.00 wt. % of an ethoxylated and propoxylated alcohol; and
   2.90 wt. % water,
   wherein the stable, buffered, emulsifiable, oil-based adjuvant concentrate is adapted to yield, when diluted, a composition having a buffered pH value of from 4 to 8.

6. The stable, buffered, emulsifiable, oil-based adjuvant concentrate of claim 5, further comprising 3.0 wt. % urea; 0.1 wt. % butyl hydroxy toluene; 0.1 wt. % of a 20% aqueous dipropylene glycol solution of 1,2-benzisothiazolin-3-one; and 0.1 wt. % of a 30% active, food-grade silicone emulsion.

7. The stable, buffered, emulsifiable, oil-based adjuvant concentrate of claim 6, wherein the tertiary amine is triethanolamine.

8. A stable, buffered, emulsifiable, oil-based adjuvant concentrate, comprising:
   50.00 wt. % of a soybean methyl ester;
   20.00 wt. % of a castor oil methyl ester;
   8.00 wt. % of an alkyl benzene sulfonic acid;
   3.00 wt. % of an orange oil;
   3.00 wt. % of a tertiary amine pH adjuster;
   3.00 wt. % of an ethoxylated alcohol;
   2.00 wt. % of an alkyl benzene sulfonated salt;
   6.00 wt. % of an ethoxylated and propoxylated alcohol; and
   2.00 wt. % water,
   wherein the stable, buffered, emulsifiable, oil-based adjuvant concentrate is adapted to yield, when diluted, a composition having a buffered pH value of from 4 to 8.

9. The stable, buffered, emulsifiable, oil-based adjuvant concentrate of claim 8, further comprising 2.70 wt. % urea; 0.1 wt. % butyl hydroxy toluene; 0.1 wt. % of a 20% aqueous dipropylene glycol solution of 1,2-benzisothiazolin-3-one; and 0.1 wt. % of a 30% active, food-grade silicone emulsion.

10. The stable, buffered, emulsifiable, oil-based adjuvant concentrate of claim 8, wherein the tertiary amine is triethanolamine.

* * * * *

UNITED STATES PATENT AND TRADEMARK OFFICE
CERTIFICATE OF CORRECTION

PATENT NO. : 10,980,228 B2
APPLICATION NO. : 14/936467
DATED : April 20, 2021
INVENTOR(S) : Paulo Sergio Berg et al.

It is certified that error appears in the above-identified patent and that said Letters Patent is hereby corrected as shown below:

In the Specification

In Column 3, Line 63, delete "and or" and insert --and/or--.

In Column 8, Line 64, delete "water" and insert --water.--.

In Column 9, Line 38, delete "(0.5%)" and insert --(0.5%).--.

In Column 9, Line 47, delete "(0.5%)" and insert --(0.5%).--.

In Column 10, Line 46, delete "agents" and insert --agents.--.

In Column 13, Lines 6-7, delete "tetrahydroprimidinyl" and insert --tetrahydropyrimidinyl--.

In Column 13, Line 50, delete "haloalky" and insert --haloalkyl--.

In Column 14, Line 20, delete "group" and insert --group.--.

In Column 18, Line 24, delete "Terciary" and insert --Tertiary--.

In Column 18, Line 26, delete "Alkohol" and insert --Alcohol--.

In Column 18, Line 32 (Approx.), delete "Alkohol" and insert --Alcohol--.

In Column 18, Line 38, delete "Preservant" and insert --Preserving--.

In Column 18, Line 42, delete "6.4:11" and insert --6.4:1--.

In Column 20, Line 24, delete "epicutular" and insert --epicuticular--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*

In Column 20, Line 48, delete "epicutular" and insert --epicuticular--.

In Column 20, Line 58, delete "epicutular" and insert --epicuticular--.